United States Patent Office 3,496,022
Patented Feb. 17, 1970

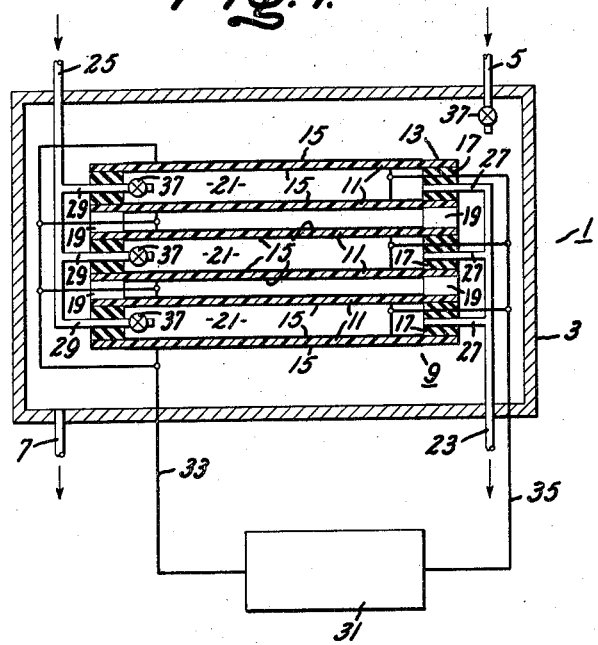
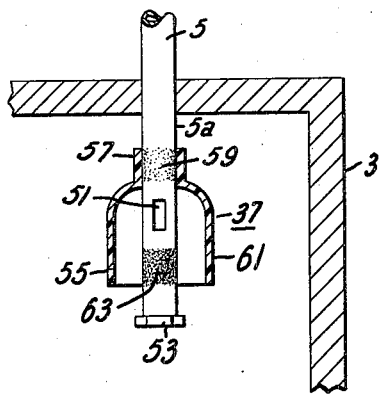
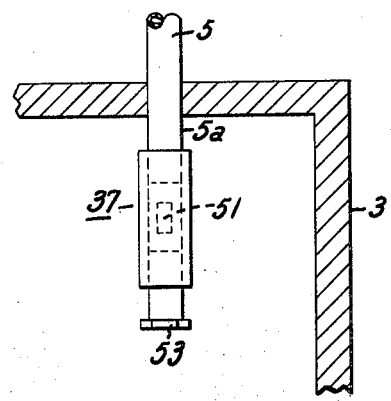

3,496,022
FUEL CELL UNITS WITH THERMALLY RESPONSIVE REACTANT CONTROL
Harry B. Lit, Peabody, Mass., assignor to General Electric Company, a corporation of New York
Filed Oct. 4, 1966, Ser. No. 584,174
Int. Cl. H01m 27/02; F16k 13/04, 17/40
U.S. Cl. 136—86                                    1 Claim

ABSTRACT OF THE DISCLOSURE

A fuel cell with a reactant supply conduit provided with a valve including a heat shrinkable sleeve which deforms to close the conduit inlet whenever the temperature exceeds a predetermined level.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

My invention relates to a fuel cell unit incorporating a thermally responsive control to limit supply of at least one reactant to a fuel cell unit.

According to the conventional practice of generating electricity a fuel and an oxidant are combined by a combustion process to liberate thermal and/or kinetic energy which is then converted to electrical energy. Over the last decade considerable interest has focused on the use of fuel cells as electrical energy conversion devices, since these cells are capable of eliminating the efficiency reducing intermediate energy conversions.

In a fuel cell it is not desired to directly combust the fuel and oxidant, as in conventional generating processes. Rather, the fuel is supplied to the cell from an external source and electrochemically oxidized at one electrode while the oxidant is electrochemically reduced at the remaining electrode. Electricity is obtained from leads connected across the electrodes.

It was early considered that the juxtaposition of substantial quantities of fuel and oxidant in fuel cells would render these devices potentially hazardous in the event of malfunction. It is well known, for example, that platinum metals, widely employed in fuel cell electrodes as electrocatalysts, are capable of readily exothermally combining hydrogen and oxygen. It was accordingly theorized that any direct mixing of reactants, as by diffusion through a small communication between the electrodes, could lead to catastrophic failures with risk of explosion and/or fire resulting. Further, it was noted that in minimizing the electrode spacing the strength of each cell was curtailed, thereby increasing the danger of an inadvertent pressure differential of relatively modest proportion rupturing the electrolyte barrier between the reactants (followed by direct mixing, fire, and/or explosion).

In the testing and use of fuel cells to date, including the most experimental designs, many cells have been damaged through internal combustion of the reactants, but injury to personnel has been conspicuously absent. In fuel cells employing ion exchange membranes as an electrolyte barrier, for example, development of pinholes in the membrane after extended life testing is not uncommon. This failure mode has not presented either an explosion or fire hazard to personnel, although the affected cells have themselves been damaged.

Fuel cells have proven themselves sufficiently from a safety standpoint that the early hazard predictions are now largely discounted by the present class of users. It should be pointed out, however, that these users are not representative of the general public. The overwhelming majority of fuel cell users to date have either received college-level training in the related physical sciences and/or have been carefully indoctrinated in the theory and use of fuel cells.

In considering the transition of fuel cell use from the present select class of users to use by the general public, including those from the underdeveloped regions, there is a need to provide a fuel cell unit for the generation of electrical energy which—to the extent possible—is not only safe and efficient when properly handled, but also safe in the hands of the uneducated, the uninstructed, the careless, or the willfully abusive user. There is a further need for a fuel cell unit which is constructed in such a manner that internal combustion of reactants can be quickly detected for protection of the apparatus from extensive damage.

It is an object of my invention to provide a fuel cell unit capable of minimizing internal combustion of reactants.

It is another object to provide a novel means for controlling the flow of at least one fuel cell reactant in order to minimize internal combustion of reactants.

These and other objects of my invention may be accomplished by providing a fuel cell unit comprised of first and second spaced electrodes and means for ionically communicating said electrodes. Means are provided for supplying a reactant to at least one of the electrodes, and means are associated with the supplying means for limiting reactant supply at a predetermined temperature including a thermally responsive element located in temperature sensing relation to a potential combustion site within a fuel cell unit.

My invention may be better understood by reference to the following detailed description considered in conjunction with the drawings, in which FIGURE 1 is a sectional view of a fuel cell unit with parts schematically illustrated, and FIGURES 2 and 3 are details with parts in section of the fuel cell unit shown in FIGURE 1.

As used herein the term "fuel cell unit" is used to designate an apparatus capable of generating electrical energy including a fuel cell or battery of such cells.

FIGURE 1 illustrates a fuel cell unit 1 comprised of a housing 3 provided with conduits 5 and 7 communicating therewith for delivery and removal of a fuel cell reactant. The housing is schematically shown unitary but may be constructed of any number of elements according to conventional techniques to form a substantially fluid tight enclosure.

For purposes of illustration a back-to-back fuel battery 9 is shown positioned within the housing. The battery is comprised of six spaced membrane-electrode assemblies 11. The assemblies each include an ion exchange membrane or electrolyte immobilizing matrix 13 provided with an electrode 15 on each major opposed face. Counting from either end, the first and second, third and fourth, and fifth and sixth assemblies are held in spaced relation by annular gaskets 17, while the second and third as well as the fourth and fifth assemblies are mounted in spaced relation by a plurality of spacer blocks 19. The gaskets and assemblies cooperate to form reactant chambers 21, which may be provided with a reactant differing from that supplied by conduits 5 and 7. For example, if the conduits 5 and 7 provide an oxidant, a fuel would be confined within chambers 21. If the housing enclosed a fuel, however, an oxidant would be provided in the chambers. To provide for the circulation of reactant to and from the chambers, conduits 23 and 25 are provided. Conduit 23 is provided with a plurality of branch conduits 27 while conduit 25 is provided with a plurality of branch conduits 29.

From the foregoing it is apparent that each assembly is provided with one electrode in contact with the reactant confined by the chambers and another electrode in contact with the reactant confined by the housing. Accordingly, if one reactant is an oxidant and the remaining reactant a fuel, an electrical current may be drawn from the electrodes. An electrical load 31 is schematically shown connected by leads 33 to the electrodes in contact with the reactant confined by the housing and connected by leads 35 to the electrodes in contact with the reactant confined by the chambers. Thus, the cells are electrically connected in parallel. Alternately the cell may be electrically connected in series or in series-parallel relation, as may be desired.

Thermally responsive flow controlling means 37 are schematically shown associated with each of the inlet conduits 29 and the inlet conduit 5. If desired, similar flow controlling means could be associated with the conduits 27 and the conduit 7. The controlling means may be of any conventional construction capable of limiting, preferably completely restricting, flow of a reactant upon sensing a predetermined temperature of the fuel cell unit. In the preferred situation in which the controlling means employs a single element to both sense the temperature level and to restrict reactant flow, as in the case of a thermally responsive valve element, the controlling means is located in the fuel cell unit so as to be in thermal proximity to any area where undesirably high heat levels may be potentially generated. Of course, it is realized that more complicated controlling means may be resorted to which merely sense the temperature level of the fuel cell unit and relay a signal externally of the fuel cell unit to limit reactant flow with respect to the unit.

In operation of the fuel cell unit shown in FIGURE 1 a first reactant, hereinafter arbitrarily designated an oxidant, is circulated within the interior of the housing 3 through conduits 5 and 7. At the same time a second reactant, a fuel, is circulated to the chambers 21 by conduits 23 and 25. Electrical energy is supplied to the load 31 through leads 33 and 35. Suitable controls may be associated with the load to regulate the voltage, current, etc., although these are not usually required, since fuel cells are largely self-regulating.

If, during operation of the fuel cell unit, the temperature should rise beyond a predetermined value, the controlling means 37 would function to limit flow of the reactants. In the absence of reactants, no energy source would be available to sustain the temperature level and the fuel cell unit would return to the desired temperature range and thereby avoid extensive damage to either the unit itself or possible injury to personnel.

For purposes of illustration, it is assumed that during operation one of the ion exchange membranes develops a pinhole so that fuel is allowed to leak from one of the chambers into the housing. The fuel-oxidant mixture would be exothermally combined by the electrocatalyst component of the electrodes 15. If this situation persisted, the pinhole might be enlarged by further destruction of the ion exchange membrane. After a period of time the thermal energy release of the combustion reaction would raise the temperature of the fuel cell unit above a predetermined level. At this time the controlling means would limit the flow of reactant. It is apparent that the exothermic reaction could be curbed with equal efficiency by eliminating either or both of the reactants participating. Accordingly, it is unnecessary that a thermally responsive controlling means be associated with the conduit delivering each reactant. Where a battery of cells are being simultaneously operated, the provision of a separate thermally responsive controlling means for the reactant supply of each cell is particularly advantageous. Noting FIGURE 1, for example, if the upper electrode-membrane assembly developed a pinhole causing combustion of the reactants thereat, it would be possible for the controlling means 37 to selectively limit reactant delivery to the chamber 21 associated with the first assembly while electricity could still be obtained from the remaining cells not associated with the reactant starved chamber. The result is that instead of a total fuel cell unit failure only a partial failure and instead of extensive damage to the unit, only limited damage to a single cell. Note further that if the pressure of the reactant within the chamber 21 is less than the pressure of the reactant within the housing combustion by mixing of gases will be confined within the affected chamber. Accordingly, the controlling means 37 can detect combustion at a very early stage.

A preferred thermally responsive controlling means is illustrated in FIGURES 2 and 3. The specific controlling means 37 includes extension conduit 5a which is shown integrally united with conduit 5 inside the housing 3. The conduit extension is provided with an outlet port 51 and a terminal plug 53. A thermally contractible sleeve 55 is fitted around the periphery of the conduit. One portion 57 of the sleeve is of reduced diameter and is preferably united in sealing relation to the conduit extension by an adhesive 59. A second, enlarged diameter portion of the sleeve overlies the outlet port 51 so that gas may pass outwardly from the port into the interior of the housing. Beneath the port the conduit extension is provided with an adhesive 63, which may be catalytically activated.

The thermally contractible sleeve may be formed of any material which will shrink in the presence of heat to a reduced diameter. Tubing of this type is commercially available from Rayclad Tubes, Inc. and Electronized Chemicals Corp. The tubes are formed by extruding a linear thermoplastic synthetic resin or rubber and subsequently irradiating. A variety of synthetic resins and rubbers have been used to fabricate the tubes including polyolefins; fluorocarbon polymers, such as polyvinylchloride, polyvinylidene fluoride, polytetrafluoroethylene, neoprene, etc. The material choice for the sleeves may vary in any particular application, depending on such factors as cost, temperature of actuation desired, etc. For example, polyolefin sleeves are available which shrink at a temperature as low as 235° F., whereas polytetrafluoroethylene sleeves are available at 620° F. Other sleeve materials are available that shrink at intermediate temperatures.

The adhesive 59 may be chosen from any conventional adhesive exhibiting chemical stability at the projected temperature levels. It is recognized that the adhesive 59 may be omitted entirely, with a shrink fit between the sleeve and conduit extension being relied upon to hold the sleeve in position. The adhesive 63 is preferably a thermoplastic material. That is, at normal operating temperatures the adhesive will be non-tacky, but will soften at or near the desired temperature of sleeve actuation so that it can sealingly bond the sleeve to the conduit extension. It is considered that the adhesive 63 may be alternatively or additionally positioned on the lower interior surface of the sleeve rather than on the conduit extension as shown.

To allow the adhesive to soften as soon as possible it may be desirable to provide a coating of catalytically active platinum metal. Accordingly, if a combustible mixture of reactants is present adjacent the sleeve, the catalyst will initiate combustion, thereby elevating the temperature of the adhesive for softening. Also, the heat generated may also radiate out to the sleeve and initiate contraction of the sleeve. In this instance it is appreciated that the controlling means does not merely sense an increased temperature but first senses and combines a combustible reactant mixture and then functions in a thermally responsive manner. Accordingly, when this form of the invention is employed it is unnecessary that the temperature rise above normal in any other portion of the apparatus in order to achieve efficient control.

FIGURE 4 illustrates the controlling means of FIG-

URE 3 as it appears when the sleeve has fully contracted in response to an elevated temperature. It is noted that the sleeve is sealed to the conduit extension above and below the port.

While my invention has been disclosed with reference to certain preferred embodiments, it is appreciated that it is practicable with many variant forms of apparatus.

For example, it is not necessary to include a housing 3 as a portion of the apparatus where ambient air is employed as an oxidant. Conduits 5 and 7 would also be eliminated, and air would reach the electrodes mounted exterior of the chambers 21 by diffusion, as is well understood in the art. According to an alternate approach, also allowing omission of the housing 3, the spacer blocks 19 may be replaced with gaskets identical to gaskets 17. A second group of conduits similar to conduits 23, 25, 27, and 29 may be provided to deliver a second reactant to the additional gaskets. Controlling means 37 may also be associated with the conduits within these gaskets. The fuel cell shown includes electrode-electrolyte assemblies comprised of an ion exchange membrane. Alternately, a matrix may be substituted. Also, a free fluid electrolyte may be used instead of an immobilized electrolyte. This may be accomplished by substituting for the ion exchange membrane 13 illustrated gaskets similar to gaskets 17 provided with suitable conduits for the circulation of the electrolyte. These modifications of the fuel cell are, of course, merely exemplary of various forms of fuel cells that may be employed in the practice of my invention. The details of fuel cell construction do not form any part of my invention and the foregoing is merely intended to illustrate various suitable conventional fuel cell apparatus combinations. Noting FIGURE 3 the elements of the fuel cells are adhesively united and held in position within the housing by conduits 23 and 25. It is recognized that mounting blocks may be associated to hold the fuels in the desired position relative to the housing and the cells may be held in assembled relation by mechanical means, such as tie bolts, rather than being adhesively united as shown. Conventional current collectors and reactant flow directors, not shown, may also be associated with the cells, as is well understood in the art.

While any conventional thermally responsive controlling means may be employed in combination with my fuel cell unit, it is preferred to use a controlling means in which the valve element is itself thermally responsive, as illustrated in FIGURES 3 and 4. It is recognized that the controlling means shown may, however, be substantially modified. For example, the plug 53 may be omitted and the conduit extension formed with a dead-end. The conduit extension may be formed separately from the conduit 5 and mechanically connected thereto. Instead of using one controlling means, as shown, a plurality of controlling means may be employed in series or parallel flow relationship to the conduit. It is unnecessary that any adhesive be used in forming the controlling means, since a substantial restriction of reactant flow can be obtained merely relying on a shrink fit between the sleeve and conduit extension. Where an adhesive is used, it is not essential that a thermoplastic be used. An adhesive that is tacky at normal operating temperatures may be employed. It may be desired to use a thermosetting resin as an adhesive, since it will form a solid bond with the sleeve after the sleeve has shrank into sealing relation with the conduit extension.

It is considered that these and other modifications will readily be suggested to those skilled in the art subsequent to understanding my basic invention. Accordingly, it is intended that the scope of my invention be determined with reference to the following claim.

What I claim as new and desire to secure by Letters Patent of the United States is:

1. A fuel cell unit comprised of first and second spaced electrodes, means for ionically communicating said electrodes, housing means enclosing said fuel cell unit, means for supplying a reactant to at least one of said electrodes including a reactant inlet to said housing, and a thermally responsive valve including fluid conduit means having a flow port and a heat shrinkable sleeve mounted on said conduit means overlying said flow port in spaced relation therewith below a predetermined temperature level for shutting off the reactant supply when said predetermined temperature is exceeded, said heat shrinkable sleeve being located in temperature sensing relation to a potential combustion site within said fuel cell housing means and being actuated to deform sufficiently to close said reactant inlet whenever the temperature exceeds said predetermined temperature level.

References Cited

UNITED STATES PATENTS

| | | | |
|---|---|---|---|
| 289,274 | 11/1883 | Kopp | 137—67 |
| 3,379,572 | 4/1968 | Gay | 136—86 |
| 3,050,786 | 8/1962 | St. John et al. | |
| 3,134,696 | 5/1964 | Douglas et al. | 136—86 |

ALLEN B. CURTIS, Primary Examiner

U.S. Cl. X.R.

137—67, 72; 264—230